United States Patent Office 3,158,579
Patented Nov. 24, 1964

3,158,579
MOLECULAR SIEVE SORBENTS BONDED WITH ION-EXCHANGED CLAY
Ernest L. Pollitzer, Hinsdale, and Bruno Kvetinskas, Palatine, Ill., assignors to Universal Oil Products Company, Des Plaines, Ill., a corporation of Delaware
No Drawing. Filed Dec. 30, 1960, Ser. No. 79,567
11 Claims. (Cl. 252—455)

This invention relates to a method of treating metal alumino-silicate sorbents of the molecular sieve type whereby the capacity of the sorbent for the selectively sorbed component is thereby increased. More specifically, the present invention concerns the treatment of metal alumino-silicate molecular sieves, and especially, the clay utilized as binder therefor, by ion-exchange with an aqueous solution of a salt of the metal component of said metal alumino-silicate whereby the foreign metallic components of the clay binder are exchanged by the metal ion of said metal alumino-silicate.

A new type of synthetic adsorbent has recently made its appearance on the market which is capable of selectively separating normal or straight chain compounds from branched and/or cyclic compounds, as well as for a large number of other types of separations, as, for example, the recovery of polar compounds, such as water and hydrogen sulfide from gases and liquids, etc. Because this material is selective for compounds on the basis of their structure and separates certain structural classes of materials from compounds whose molecular structures are different, it is referred to as a "molecular sieve," these sorbents retaining those materials which are selectively sorbed within the porous structure of the molecular sieve and allowing other classes of compounds not sorbed by the molecular sieve to pass through and be collected as the so-called "raffinate" components of the mixture.

The molecular sieve sorbents contemplated herein for treatment by means of the process of this invention to improve their capacity and selectivity are the dehydrated, zeolitic metal alumino-silicates having a porous structure by virtue of the dehydration of the zeolite. The resulting pores in the dehydrated zeolite have cross-sectional diameters of from about 4 to about 13 Angstrom units, depending upon the mode of synthesis and composition. If the reagents utilized in the preparation of these silicates are free of foreign ions, the pores in the product of any particular preparation are of uniform size. These molecular sieve sorbents are prepared, generally by synthetic means, although certain natural forms of the sodium and calcium alumino-silicates exist in hydrated form as specific minerals, such as gmelinite, chabazite, etc., which upon heating to a temperature above about 200° C., lose their water of crystallization and in the place of the loosely-held water of crystallization, the dehydration leaves vacant spaces or porous openings through which molecules of the selectively sorbable component of the feed stock mixture may penetrate and be trapped during the separation procedure.

In the preparation of the synthetic forms of molecular sieve sorbents, the sodium derivative of the metal almino-silicate is generally, although not necessarily, prepared initially by reacting at a temperature in the region of the boiling point of water one or more of each of the following classes of reagents: (1) a silica-yielding compound such as sodium silicate (i.e., water-glass) an aqueous silica sol suspension, an alcohol ester of silicic acid, such as ethylorthosilicate, or other suitable source of silica sol, (2) a source of alumina, such as freshly precipitated aluminum hydroxide, sodium aluminate, alumina sol, etc., (3) an alkali metal base such as sodium hydroxide, or sodium carbonate, and (4) water, utilizing certain defined molecular ratios of the reactants to provide the required $M_2O$: $Al_2O_3$: $SiO_2$: $H_2O$ ratio, where M is an alkali metal or other metal divided by its valence. The combination of the molar ratio of reactants, the temperature, and the particular reacting ingredients results in the formation of a mass of finely divided crystals of the metal alumino-silicate in hydrated form which may be separated by filtration from the aqueous mother liquor. Upon heating the recovered metal alumino-silicate crystals (generally the sodium derivative in the initial preparation) to a temperature of about 200° C. or higher, the zeolitic crystals lose their water of hydration, the resulting sodium form of the metal alumino-silicate being a highly active molecular sieve for the separation of, for example, polar compounds from non-polar compounds, such as moisture from non-polar gases or liquids, sulfur dioxide or hydrogen sulfide from light hydrocarbon gases or air, light hydrocarbon gases from inert gases, such as the separation of methane from hydrogen, and for a large number of other separations. These separations are based upon the fact that the dehydration of certain species of sodium alumino-silicate leaves pore openings of about 4 Angstrom units in cross-sectional diameter in the structure of the crystals, and the resulting molecular sieve particles readily accept other molecules whose smallest molecular diameters are about 4 Angstrom units or less. The pores, being of insufficient size to accept molecules whose critical diameters exceed 4 Angstrom units, are therefore highly selective sorbents, but only if all of the metal ions in the structure of the silicate are sodium. The presence of ions of other metals in some of the crystals decreases the selectivity of the silicate for molecules of no greater than 4 Angstrom units in cross-sectional diameter, since the presence of other metal ions in the reaction mixture during the crystallization of the zeolitic metal alumino-silicate results in the formation of larger pores and non-uniformity. The resulting non-uniformity in the size of the pores decreases the selectivity of the product as a sorbent because of the tendency of the crystals to accept molecules of the raffinate into the pore openings of the sieve particles, thereby reducing the purity of the sorbate product separated by the sieves.

The sodium derivative of the metal alumino-silicate may be converted into other metal derivatives by replacement of the sodium ion of the silicate crystal with other metal ions, such as the alkaline earth metals, other alkali metals, and a wide variety of other metallic ions. The replacement is effected by mixing the sodium alumino-silicate crystals with an aqueous solution of a salt of the replacement metal for a time sufficient to effect ion-exchange of the sodium ion in the sodium alumino-silicate structure by the metal of the metallic salt dissolved in the aqueous solution constituting the ion-exchanging medium. The procedural details therefor are more explicitly described in the examples which follow. Typical metals which may be substituted for sodium in the sodium alumino-silicate structure are other mono-valent or divalent cations such as lithium and potassium of the alkali metals, silver, calcium, magnesium, barium, strontium, hydrogen, the ammonium ion and certain members of the transition metals, including titanium, chromium, manganese, iron, scandium, vanadium, nickel, niobium, molybdenum, palladium, tungsten, platinum, and other metallic elements whose atomic numbers are from 21 to 28, from 39 to 46 and from 72 to 78 inclusive. When the sodium ions are replaced from a crystalline sodium alumino-silicate species in which the pore diameters are about 4 Angstrom units by a divalent cation such as calcium or magnesium, the resulting crystals may have pore diameters of about 5 Angstrom units which permit the entry of compounds having critical molecular diameters of 5 Angstrom units or less into the pore openings. Thus, in addition to the light hydrocarbons (less than 3 carbon atoms per molecule) sorbed by the sodium salt, the alkaline earth metal exchanged salts also sorb straight chain compounds whose critical molecular diameters are not greater than 5 Angstrom units, rejecting branched chain and cyclic compounds of the same carbon atom content which are too large to enter the pores. Depending upon the metal ion used to replace the sodium in the molecular sieve structure and the conditions of preparation, the pore openings in the molecular sieve structure may range in size from about 3 Angstrom units up to about 13 Angstrom units, capable of accommodating molecules of such size in typical separation techniques utilizing molecular sieves. All of the various foregoing metal alumino-silicates having a variety of pore opening sizes may be utilized as the sorbent subject to the present treatment process and are contemplated for use as starting material herein.

The metal alumino-silicates as prepared by the foregoing techniques are produced in the form of finely divided crystals of from about 0.1 to about 25 microns at their broadest dimension, depending upon the method of preparation. These crystals are of such minute sizes that when an attempt is made to pass a fluid feed stock through a mass of the crystals in order to separate the components present in the feed stock, the flow of fluid through the mass of finely divided sorbent particles is extremely slow and the use of the crystals themselves for the purpose is commercially impractical. In order to utilize the highly effective molecular sieve properties of these metal alumino-silicates in separation processes for the removal and/or recovery of one or more of the components of a fluid feed stock, it has been found that the finely divided crystals of molecular sieve sorbent must be formed into a structurally stable particle of larger size in order that the fluid passageways around the particles and between them be of sufficient size to permit the free flow of the fluid through the bed of particles. The method devised for this purpose which takes advantage of the sorptive abilities of the silicates for this type of separation is one which provides for mixing the finely divided crystals with a porous clay binder and extruding the resulting mixture into pills of larger size, as well as other methods of compositing the clay with the molecular sieve crystals. These pills then provide a mass of the particles having void spaces between the edges of the individual particles through which a fluid feed stock may flow without undue resistance to the flow of the fluid stream. The fluid feed stock to be separated enters the extruded particle, flows through the porous clay binder, and readily enters the molecular sieve crystals through the porous structure of the particle. It has been found, however, that all clays suitable for use as a binding material in the formation of molecular sieve pellets by the aforementioned compositing procedures contain foreign ions of metals which are not compatible with the metal ion present in the metal alumino-silicate. For example, most clays contain potassium ions as well as iron salts which, when they come in contact with a calcium alumino-silicate or a sodium alumino-silicate, under-go ion-exchange with the metal alumino-silicate in contact with the clay, thereby altering the chemical composition of the sorbent and changing its intended capacity to a generally lesser capacity because of the ion-exchange reaction between the foreign metal ions present in the clay with the metal ion present in the metal alumino-silicate.

These foreign metal ions naturally occurring with the clay used as the binding material are exchanged for the metal ion present in the metal alumino-silicate by virtue of the intimate contact between the clay binder and the metal alumino-silicate during the compositing procedure, resulting in a depletion in the quality and effectiveness of the molecular sieve sorbent. Thus, a major proportion of the potential capacity of the silicate initially present in the molecular sieve sorbent is lost during the compositing procedure with the clay binder. The process of the present invention provides a means of eliminating the foreign metal contaminant present in the clay binder by replacement with the metal present in the metal alumino-silicate, thereby preventing the subsequent ion-exchange reaction between the clay and the metal of the silicate.

One object of this invention is to increase the capacity of a molecular sieve sorbent of the metal alumino-silicate type. Another object of this invention is to eliminate foreign cations from clay binder material whereby the composite thereof with metal alumino-silicate crystals has greater capacity for its intended purpose.

In one of its embodiments this invention relates to a process for increasing the selectivity and capacity of a metal alumino-silicate molecular sieve sorbent formed into discrete particles by compositing crystals of the metal alumino-silicate with a clay binder and pressing the mixture into said discrete particles which comprises contacting said clay binder with an aqueous solution of a salt of the metal in said metal alumino-silicate at ion-exchange reaction conditions for a time sufficient to substantially exchange foreign ions present in said clay with said ions of the metal in said metal salt.

Other objects and embodiments of this invention will be further explained in the following further description of this invention.

The present process of treatment is effective for enhancing the sorptive properties of all of the foregoing molecular sieve sorbents of the metal alumino-silicate type, but is especially effective for the treatment of the alkali metal and alkaline earth metal alumino-silicates and particularly the calcium alumino-silicates which have a pore diameter of about 5 Angstrom units, and are utilized for the separation of straight chain organic compounds from their branched chain and cyclic isomers or homologs, such as the hydrocarbon mixtures. The alkali metal and alkaline earth metal alumino-silicates are peculiarly subject to treatment herein because foreign metallic ions occur most frequently in the commonly used clay binders for this purpose. The alkali metal and alkaline earth metals are also peculiarly subject to displacement by such foreign ions present in the commonly used clays for binder purposes. In thus indicating the preferred class of metal alumino-silicate sorbents for treatment herein, it is not thereby intended to necessarily restrict the scope of the treatment process provided by the present invention necessarily to such preferred sorbents, the process also being applicable to other metal alumino-silicates, as heretofore described.

The clay utilized as the binder for compositing with the metal alumino-silicate sorbent must have a combination of properties which adapts the clay for this use. Thus, the clay binder must be generally porous in structure to permit the fluid feed stock to penetrate through the body of the particle containing the metal alumino-silicate crystals in the body of the molecular sieve particles. In addition, the clay binder must at the same time have sufficient cohesiveness to cause the particle formed by the extruding, pilling, or other forming procedure to hang together under stress, thereby eliminating the problem of attrition when the sorbent particles are moved into and from the apparatus in which the sorption separation is to take place. The clay binder must also be substantially inert to the components present in the fluid feed stock stream, except for its sorptive capacity associated with the action of the molecular sieve particle. Still another requisite characteristic of the clay binder material which will adapt it for use as binding material in the present sorbent composition, is a certain refractiveness to high temperatures which will permit the sorbent to be activated at temperatures up to about 500° C. without deterioration in the structure of the clay, particularly with respect to its melting point and its ability to withstand high temperatures without coalescence. Suitable clays having the foregoing properties and satisfactory for use as a binder in the formation of pelleted or other shaped metal alumino-silicate sorbents are the fire-clays, potter's clay, Fuller's earth, kaolinite and other clays of high kaolin content, particularly the Attapulgus clays which may be utilized directly in their natural state or which may be previously water-washed, acid-treated, calcined or otherwise treated prior to mixing with the metal aluminosilicate sorbent. In most instances, the molecular sieve sorbent crystals prior to dehydration are mixed with from 10 to about 40 percent of clay in the form of a slurry of the clay in water and the resulting mixture formed into a paste which is thereafter extruded through a pilling machine to form cylindrically-shaped particles or rolled to form spheres which may vary in size from 1/100 to 1/4 inch in diameter. For some uses the finished product may contain up to about 90 percent by weight of the binder clay. The reference herein to the process of "treating the clay" is intended to generically encompass several alternative methods of treatment, including the treatment of the clay individually in a procedure prior to the compositing step, as well as treatment of the clay in admixture with the molecular sieve crystals after mixing these ingredients and before or after the compositing step.

After formation of the pellets or pills of the metal alumino-silicate containing the clay binder, the pills are thereafter subjected to calcination whereby the molecular sieve becomes activated and loses its water of hydration to form a sorbent which is active for separating the mixture of compounds in the feed stock to be processed. For this purpose, the molecular sieves are heated to a temperature above about 200° and more preferably, from about 300° to about 500° C. for a period of from ½ to about 6 hours and preferably with a stream of dry nitrogen air or other inert gas flowing around the particles in order to dehydrate and activate the molecular sieve crystals within the structure of the sorbent particle.

Several process procedures are available for effecting the treatment provided by means of the present invention whereby the foreign ions present in the clay binder become exchanged with metal ions of the metal aluminosilicate molecular sieve to thereby provide a sorbent having the maximum capacity and selectivity for the particular separation problem involved in the treatment of the feed stock. Thus, the foreign ions present within the clay utilized as binder for the molecular sieve crystals may be subjected to treatment with the aqueous salt solution either before or after forming into particles of the molecular sieve sorbent. Thus, the clay itself is to be subsequently used as binder in the compositing procedure, is, in accordance with one of the present methods of treatment provided herein subjected to ion-exchange treatment prior to mixing the clay with the metal alumino-silicate crystals. An aqueous solution of a salt of the metal present in the metal alumino-silicate, in acordance with this method of treatment, is mixed with the clay binder material and allowed to stand at ion-exchange conditions for a time sufficient to accomplish the displacement of the undesired foreign ions from the clay binder material. The preferred, and most convenient means of accomplishing this objective is to continuously wash a given mass of the clay with a stream of an aqueous solution of the metal salt flowing through the clay at ion-exchange conditions until the clay has been sufficiently treated in this manner. Another method which accomplishes the treatment in a similar countercurrent flow means comprises mixing the clay with an aqueous solution of the metal salt to be ion-exchanged with the foreign ions present in the clay, thereafter filtering the remaining aqueous solution from the treated clay and mixing the filter cake with an additional aliquot of the aqueous solution of the metal salt, again filtering, and continuing this procedure until the clay has been sufficiently treated and substantially all of the foreign ions have been removed therefrom. Thereafter, the treated clay is mixed with the metal aluminosilicate crystals, formed into pellets, pills or spheres, dehydrated and calcined to form the activated sorbent, as aforesaid.

In another method of effecting the present treating process the sodium form of the metal alumino-silicate (that is, the form in which the molecular sieve crystals are preferably initially prepared), is thoroughly and intimately mixed with an appropriate quantity of the clay and formed into pellets or extrudate particles. The particles are thereafter preferably oven-dried, although the pills prior to drying may also be treated in accordance with the present process to exchange the foreign ions from the clay binder material. The pellets before or after being oven-dried are then mixed with an aqueous solution of the metal salt of the metal alumino-silicate to effect the desired displacement of foreign metal ions, either by the continuous method of flowing the aqueous solution through a column of the pelleted composite or by mixing the pellets with individual aliquots of the aqueous solution, accompanied by alternate and successive draining of the remaining aqueous solution from the pills. The final treated pellets may thereafter be activated at a temperature above about 200° C., up to about 500° C. to yield the desired molecular sieve sorbent for use in the separation process.

In still another method of effecting the treatment of the clay binder material in accordance with the process of this invention, the crystals of the sodium form of the metal alumino-silicate, after being separated from the aqueous mother liquor in which they are formed, are filtered and dried and mixed with the clay binding material, the resulting mixture thereafter being treated with the aqueous solution of the metal salt of the metal aluminosilicate to effect not only the replacement of the sodium from the sodium alumino-silicate crystals with the metal ion but also ion-exchange of the foreign metal ions present in the clay binding material with the metal present in the metal salt dissolved in the aqueous solution.

The aqueous solution utilized for treatment of the clay binder material, in accordance with the methods hereinabove presented, is an aqueous solution which may contain up to 2 to 3 mols of the metal salt per liter of solution, although generally, concentrations of from about 0.2 to about 0.5 mol of salt per liter of solution are satisfactory. The treatment is effected at a temperature and pressure sufficient to maintain the aqueous solution in substantially liquid phase, preferably at a temperature of from about 30° to about 100° C., at which temperature the desired ion-exchange takes place rapidly and to a relatively high degree of completion. Some metal aluminosilicates, however, do not readily undergo ion-exchange and must be treated for long periods of time at temperatures up to 200° C. while maintaining the mixture at an elevated pressure.

In all of the foregoing methods of treatment, the resulting metal alumino-silicate sorbent is more highly active (that is, has greater selectivity and capacity) than the molecular sieve prepared from untreated binding clay. The product, in any event, has more of the desirable properties required of the molecular sieve sorbent.

The present invention will be further described with respect to specific embodiments thereof in the following examples, which, however, are not intended to unduly restrict the scope of the invention necessarily in accordance therewith.

In the following runs, various ion-exchange methods were utilized to effect the removal of foreign metal ions from the clay binder utilized in preparing the pellets of molecular sieve particles, including pretreatment of the clay itself, and treatment of the formed alumino-silicate-clay binder composition. In each of the following preparations, the sodium form of the metal alumino-silicate is prepared initially and the resulting product thereafter subjected to ion-exchange whereby the sodium ion of the sodium alumino-silicate is replaced by the metal ion ultimately desired in the final product. Several types of metal alumino-silicates were prepared, including the species having pore opening sizes of about 4 Angstrom units in the sodium form and about 5 Angstrom units in the calcium form, depending upon the cation involved.

Sodium alumino-silicate crystals having pores of about 4 Angstrom units, in hydrated form are prepared by mixing a solution of sodium aluminate (General Chemical Co.) containing 63.8 percent sodium aluminate, 17.7 percent free sodium hydroxide and 18.5 percent water with water and "N" brand water-glass containing 28.2 percent silica and 9.32 percent equivalent of sodium oxide, in amounts sufficient to provide the following ratios of oxides:

| | |
|---|---|
| Silica/alumina | 0.53 |
| Sodium oxide/silicon oxide | 5.86 |
| Sodium oxide/aluminum oxide | 3.1 |
| Sodium oxide/water | 51.0 |

The mixture is maintained at a temperature of 100° C. for twenty-two hours, the resulting crystals of hydrated sodium alumino-silicate being filtered by suction from the mother liquor, the recovered crystals washed with water and thereafter dried in air to a constant weight, the product containing approximately 20 percent by weight of water.

The sodium forms of the metal alumino-silicate as prepared above is activated by heating the same at 350° C. with a stream of nitrogen, air, or other inert gas flowing through it for about two hours, the crystals thereby losing their water of crystallization to form a powder consisting of finely divided crystals of the sodium salt.

The sodium form of the metal alumino-silicate sorbent (that is, the molecular sieve product in which the pore openings are about 4 Angstrom units in diameter) is a highly effective desiccant and removes certain polar gases such as water vapor, ammonia, sulfur dioxide, etc., from other media which are either less tightly held or not sorbed by the molecular sieves, such as gaseous or liquid hydrocarbons, hydrogen, nitrogen, etc., at atmospheric temperatures and pressures. These sorbents are also useful for the separation of low molecular weight hydrocarbons such a methane, ethane, etc., from gases such as hydrogen, nitrogen, etc. The partial pressures of the sorbed gases are reduced to low levels in the effluent gas streams.

By conversion of the sodium form of the metal aluminosilicate into the corresponding calcium derivative salt by ion-exchange, followed by dehydration of the resulting ion-exchanged product, the pore openings in the molecular sieve sorbent are made slightly larger (about 5 Angstrom units) and the resulting molecular sieves are capable of accommodating compounds having a larger cross-sectional diameter than the alkali metal derivative salts. Thus, the sodium salt derivative is limited to the sorption, in appreciable quantities, of hydrocarbons containing fewer than 3 carbon atoms per molecule while the calcium salt derivative may be applied to the sorption of straight chain hydrocarbons containing three or more carbon atoms per molecule, in addition to the lower molecular weight hydrocarbons which the sodium derivative will sorb.

Calcium exchange of the sodium ion is effected by contacting the sodium alumino-silicate with an aqueous solution of an ionizable calcium salt, such as calcium chloride, in accordance with the following procedure.

The finely divided sodium alumino-silicate crystals prepared as indicated above are placed in a glass tube approximately 1 centimeter in diameter and 12 inches in length, open at the top and containing a plug of glass wool at the bottom to retain the molecular sieves within the column. A calcium chloride solution containing 80 grams of calcium chloride per liter of water (0.72 mole percent) is poured into the space above the molecular sieve particles, the solution thereafter flowing downwardly through the column of sodium alumino-silicate crystals and out of the bottom of the column. The calcium chloride solution is added in additional aliquots to the column containing the sodium alumino-silicate crystals until calcium chloride begins to appear in the liquor withdrawn from the bottom of the column, as indicated by the formation of a calcium carbonate precipitate when the liquid effluent is allowed to flow into a solution of potassium carbonate.

After completion of the calcium exchange, as noted by the appearance of calcium in the effluent stream from the ion-exchange column, the calcium alumino-silicate crystals within the column are continuously washed with water until the effluent stream removed from the bottom of the column is substantially free of chloride ions. The crystals are thereafter removed and dried to a constant weight in an open dish at room temperature or up to about 110° C. in an oven, followed by activation and dehydration of the water of crystallization by heating the crystals at 350° C. in perfluent nitrogen for two hours. The resulting calcium alumino-silicate crystals are tested for their sorptive capacity by a gas chromatographic technique utilizing a mixture of normal butane and nitrogen, the mixture passing through a column of the calcium alumino-silicate on test at room temperature until the crystals are saturated with n-butane. The capacity of any sorbent at room temperature for any normally gaseous sorbate can be determined by this technique. At elevated temperatures, capacities for normally liquid sorbates can also be determined. In order to compare the capacities of the various samples of molecular sieves on a common basis, the sorptive capacity of each product sample is expressed as a percentage ratio of the capacity of the dehydrated calcium alumino-silicate crystals themselves prior to compositing with the clay binder, the capacity of the crystals without binder being taken as standard, at 100 percent. In this manner, the effect of compositing the crystals with the clay binder may be measured directly by comparing the capacity of a given sample of composite (i.e., after mixing the crystals with clay and forming into pills or pellets) with the capacity of the free crystals at 100 percent. Prepared as indicated above, the calcium alumino-silicate crystals in their activated, dehydrated form sorb 13.1 grams of n-butane per 100 grams of crystals at atmospheric pressure and at 25° C., corresponding to a capacity of 100 percent.

The selectivity of a particular sorbent for a pair of sorbates is based upon the following ratio:

$$\frac{\text{Grams of major sorbate sorbed/100 g. of sorbent}}{\text{Grams of minor sorbate sorbed/100 g. of sorbent}} = \text{Selectivity}$$

For example, a particular sample of sodium alumino-silicate is capable of sorbing 7.4 g. of ethane/100 g. of sorbent and the same sample is capable of sorbing 0.2 g. of n-butane/100 g. of sorbent; thus, the selectivity is:

$$\frac{7.4}{0.2}$$

or 37.

Samples of the above sodium and calcium forms of the alumino-silicates in their hydrated, crystalline forms, are each mixed with enough binder clay to form a molecular sieve sorbent composite containing 20 percent by weight of the binder clay on a water-free basis. For this purpose, the wet, hydrated forms of the sodium and calcium alumino-silicate crystals are mixed with Attagel 20 which is a pulverized, colloidal form of Attapulgus clay (essentially a hydrous magnesium aluminum silicate also containing small proportions of other elements, such as iron, potassium, arsensic, calcium and sodium). The Attagel 20 utilized in the present runs is supplied by Minerals and Chemicals Corporation of America. A thick paste is prepared consisting of 80 parts by weight of the metal alumino-silicate, 20 parts by weight of Attagel 20 and enough water to form a mass of putty-like consistency when mixed. The mixture is thereafter extruded and formed into cylindrical pills approximately $\frac{1}{16}$-inch in diameter by $\frac{1}{8}$-inch in length. The pills are then dried at 110° C. for two hours and thereafter heated for two additional hours at 350° C. as dry nitrogen is passed through the heated pills to thereby activate the molecular sieve sorbent contained within the composite. The resulting pilled and activated sorbents are thereafter tested to determine their capacity and selectivity.

The sodium and calcium forms of the metal aluminosilicate are tested for their capacity and selectivity by contacting the molecular sieve particles before and after compositing the crystals with clay binder by means of a gas chromatographic procedure wherein the desired sorbates, each mixed with a "carrier" or "diluent" gas, usually nitrogen, are passed through a packed column of the sample of molecular sieve being tested until the sorbent is saturated, and determining the amounts of each sorbate entering the sample by continuously measuring the thermal conductivity of the effluent gas stream. The results are converted to a common basis of 100 percent active crystals and these results are compared with the capacities of the free crystals at 100 percent activity. In each test, the sorbate component is mixed with an equal weight proportion of dry nitrogen and this mixture passed through the test apparatus. The activity (capacity) of the sodium alumino-silicate molecular sieves is measured by passing a dried, 50–50 weight percent mixture of ethane and nitrogen through the test apparatus at atmospheric temperature and pressure, while the activity of the calcium-exchanged salt is measured at the same conditions with a 50–50 mixture of n-butane and nitrogen. The selectivity of each species, which in the sodium form has a pore diameter of about 4 Angstrom units and in the calcium form, a pore diameter of about 5 Angstrom units is measured by contacting the product first with a mixture of n-butane and nitrogen containing 50 weight percent of nitrogen and then with a 50–50 mixture of ethane and nitrogen, measuring the amount of each sorbate entering the pores of the sorbent after each test.

Thus, each sample of free crystalline metal aluminosilicate is tested to determine the capacity of the samples for the particular class of components for which the molecular sieves are supposed to be selective prior to mixing the crystals with the clay binder. Thereafter the crystals are composited with the clay binder and their selectivities and capacities again determined. Finally, the composites of clay with metal alumino-silicates are tested for capacity and selectivity utilizing a treatment procedure which eliminates the foreign metal ions, in accordance with the process of this invention, one method of treatment comprising the following procedure:

Samples of the sodium and calcium alumino-silicate crystals prepared by the above procedure are composited with a clay binder which has been ion-exchanged with the corresponding alkali metal and alkaline earth metal chlorides in a preliminary treatment prior to compositing the crystals with the treated clay, in accordance with the following procedure:

A sample of Attagel 20 is mixed with four volumes of a 10 percent aqueous solution of calcium chloride and another sample with four volumes of a 10 percent aqueous solution of sodium chloride. The samples of slurry are heated on a steam bath for two hours, filtered and again slurried with a fresh aliquot of the salt solutions, followed by heating on the steam bath for an additional two hours, and filtering and washing the filter cake with distilled water until the filtrate is substantially free of chloride ion. After drying, the sodium chloride and calcium chloride treated clays are mixed, respectively, with sodium alumino-silicate and calcium alumino-silicate crystals to form mixtures containing in each case 20 percent by weight of the treated clay. The mixtures are thereafter pilled into $\frac{1}{16}$-inch by $\frac{1}{8}$-inch pellets and activated by heating to 350° C. for three hours in perfluent nitrogen.

In accordance with another procedure for testing the molecular sieve particles having pore diameters of about 5 Angstrom units, crystals of calcium alumino-silicate having a capacity of 13.1 grms. of n-butane/100 grms. of crystals (100 percent capacity) are mixed with the clay binder material, pressed into pellets $\frac{1}{16}$-inch by $\frac{1}{8}$-inch and thereafter treated in accordance with the process of this invention by soaking the pellets in a $Ca^{++}$ ion-exchange solution (calcium chloride). In this treatment the pellets are covered with an aqueous calcium chloride solution containing 0.72 mol of calcium chloride per liter and allowed to stand in contact with the solution for one hour. Thereafter, the solution is drained from the pellets and the treated pellets again covered with the calcium chloride solution. This procedure is repeated three times, followed by replacement of the solution with distilled water for five treatments to remove the chloride.

The treated pellets are thereafter dried at 110° C. for two hours and then activated by heating the treated pellets in a stream of dry nitrogen at a temperature of 350° C. for two hours. The treated, activated pellets when tested for capacity and selectivity by the aforementioned gas chromatographic method in which the pellets are first contacted at room temperature (30° C.) and at atmospheric pressure with a mixture of 50 percent by weight of n-butane and 50 percent by weight of nitrogen, and thereafter with a mixture of 50 percent by weight of ethane and 50 percent by weight of nitrogen. The capacity of the pellets are measured by determining the amount of each sorbate entering the sample. The pellets, saturated with n-butane, adsorbed only an additional 0.3 percent by weight of ethane. However, a sample of the same composite activated without benefit of the calcium chloride pretreatment, after saturation with n-butane, sorbed an additional 1.5 percent by weight of ethane.

In still another method of treatment provided herein, a sample of the sodium form of the metal alumino-silicate crystals as they are removed from the mother liquor in the initial crystallization are mixed in their wet state with Attagel 20 clay binder in a proportion which will yield a 20 percent clay composite after drying and activation, approximately 86 parts by weight of wet crystals with 14 parts by weight of Attagel 20. Sufficient 0.72 mol percent calcium chloride solution is mixed with the foregoing dry mixture to form a thin slurry and the resulting mixture heated in a closed container on a steam bath for two hours. The supernatant liquor is filtered from the solids and the filter cake again mixed with an approximately equal volume of the calcium chloride solution, followed by heating the slurry on the steam bath for two hours. The recovered filter cake is washed with distilled water until the filtrate is substantially chloride free.

The mixture of calcium-exchanged clay and calcium alumino-silicate crystals is thereafter pilled, dried, and activated in accordance with the procedure described above and the resulting pills tested to determine their capacity for n-butane by the chromatographic procedure described above.

The following Tables I and II present the results of the above-indicated tests, as identified in the tables:

TABLE I

*Capacities and Selectivities of Sodium Alumino-Silicate Prior to and After Compositing with Clay and After Ion-Exchange of the Samples*

| Sample No. | Capacity for Ethane, g.-C$_2$H$_6$/100 g. of— | | Capacity for C$_2$H$_6$, percent [a] | Capacity for n-Butane, g.-n-C$_4$H$_{10}$/100 g. of— | | Selectivity = g.-C$_2$H$_6$/100 g. clay-free crystals/g.-n-C$_4$H$_{10}$/100 g. clay-free crystals |
|---|---|---|---|---|---|---|
| | Composite | Clay-free crystals | | Composite | Clay-free crystals | |
| 1 | | 7.40 | 100 | | 0.20 | 37.0 |
| 2 | 4.85 | 6.07 | 82 | 0.72 | 0.90 | 6.7 |
| 3 | 5.81 | 7.25 | 98 | .16 | 0.20 | 36.2 |
| 4 | 5.70 | 7.12 | 96 | .16 | .20 | 35.6 |

[a] The capacity of clay-free sodium alumino-silicate crystals are taken as a standard at 100 percent.

Sample No. 1.—Sodium alumino-silicate crystals containing no binder clay.
Sample No. 2.—Composite of 80 wt. percent sodium alumino-silicate and 20 weight percent of untreated clay binder.
Sample No. 3.—Composite of 80 wt. percent sodium alumino-silicate and 20 wt. percent of clay that had been ion-exchanged with NaCl prior to compositing.
Sample No. 4.—Same as Sample 2 which had been ion-exchanged with sodium chloride solution prior to activation.

TABLE II

*Capacities of Calcium Alumino-Silicate Prior to and After Compositing With Clay and After Ion-Exchange of the Clay With Calcium Chloride Solution*

| Sample No. | Capacity for n-Butane, g.-n-C$_4$H$_{10}$/100 g. of— | | Capacity for n-C$_4$H$_{10}$, percent [a] |
|---|---|---|---|
| | Composite | Clay-free crystals | |
| 6 | | 13.1 | 100 |
| 7 | 8.2 | 10.2 | 78 |
| 8 | 10.1 | 12.6 | 96 |
| 9 | 10.0 | 12.5 | 95 |
| 10 | 10.1 | 12.6 | 96 |

[a] The capacity of the clay-free crystals of calcium alumino-silicate are taken as a standard at 100 percent.

Sample No. 6—Calcium alumino-silicate crystals containing no binder clay.
Sample No. 7.—Composite of 80 wt. percent calcium alumino silicate and 20 wt. percent of untreated clay binder.
Sample No. 8.—Composite of 80 wt. percent calcium alumino silicate and 20 wt. percent of clay that had been ion-exchanged with calcium chloride solution prior to compositing.
Sample No. 9.—Sample 7 material which had been ion-exchanged with calcium chloride solution prior to activation.
Sample No. 10.—A composite mixture of 80 wt. percent of sodium alumino-silicate and 20 wt. percent untreated clay is prepared, followed by ion-exchanging the mixture with calcium chloride solution, pelleting the mixture and then activating the pellets by the standard procedure.

We claim as our invention:

1. A process for increasing the selectivity and capacity of a metal alumino-silicate molecular sieve sorbent formed into discrete particles by compositing crystals of the metal alumino-silicate with a clay binder and pressing the mixture into said discrete particles which comprises contacting said clay binder with an aqueous solution of a salt of the metal in said metal alumino-silicate at ion-exchange reaction conditions for a time sufficient to substantially exchange foreign metal ions present in said clay with ions of the metal in said metal salt.

2. The process of claim 1 further characterized in that said clay is ion-exchanged with said aqueous solution of the salt of the metal in said metal alumino-silicate prior to compositing the resulting clay with said crystals of metal alumino-silicate.

3. The process of claim 1 further characterized in that said clay binder is ion-exchanged with said aqueous solution of the metal salt of the metal in said metal alumino-silicate after compositing said clay binder with the crystals of metal alumino-silicate and after forming the mixture into discrete particles.

4. The process of claim 1 further characterized in that said clay and crystals of metal alumino-silicate are mixed, the resulting mixture ion-exchanged with said aqueous solution and thereafter the ion-exchanged mixture is pressed into said discrete particles.

5. The process of claim 1 further characterized in that the metal of said metal alumino-silicate is an alkali metal and said metal salt is an alkali metal salt.

6. The process of claim 5 further characterized in that said alkali metal is sodium.

7. The process of claim 1 further characterized in that the metal of said metal alumino-silicate is an alkaline earth metal and said metal salt is an alkaline earth metal salt.

8. The process of claim 7 further characterized in that said alkaline earth metal is calcium.

9. The process of claim 1 further characterized in that said clay is contacted first with said aqueous solution and thereafter with ion-free water under countercurrent flow conditions.

10. The process of claim 1 further characterized in that said clay is an Attapulgus clay.

11. The process which comprises forming hydrated crystals of an alkali metal alumino-silicate, mixing said crystals with a clay binder, contacting the resulting mixture with an aqueous solution of a salt of the alkali metal in said alumino-silicate at a temperature and concentration of said solution sufficient to ion-exchange foreign metal ions in said clay with ions of the alkali metal in said salt, pressing the mixture of solids into discrete particles and dehydrating and activating said alumino-silicate at a temperature of from about 150° to about 500° C.

References Cited in the file of this patent

UNITED STATES PATENTS

| | | |
|---|---|---|
| 2,834,429 | Kinsella et al. | May 13, 1958 |
| 2,908,549 | Estes | Oct. 13, 1959 |
| 2,971,824 | Johnson et al. | Feb. 14, 1961 |
| 3,039,953 | Eng | June 19, 1962 |
| 3,055,841 | Gladrow et al. | Sept. 25, 1962 |